(12) United States Patent
Zhao et al.

(10) Patent No.: US 11,283,269 B2
(45) Date of Patent: Mar. 22, 2022

(54) CHARGING DOCK AND CHARGING ASSEMBLY

(71) Applicant: SZ DJI TECHNOLOGY CO., LTD., Shenzhen (CN)

(72) Inventors: Tao Zhao, Shenzhen (CN); Kenan Li, Shenzhen (CN); Xiaokai Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 425 days.

(21) Appl. No.: 16/367,821

(22) Filed: Mar. 28, 2019

(65) Prior Publication Data

US 2019/0222033 A1 Jul. 18, 2019

Related U.S. Application Data

(63) Continuation of application No. PCT/CN2016/100888, filed on Sep. 29, 2016.

(51) Int. Cl.
*H02J 7/00* (2006.01)
(52) U.S. Cl.
CPC .......... *H02J 7/0013* (2013.01); *H02J 7/0045* (2013.01)
(58) Field of Classification Search
CPC ............................. H02J 7/0013; H02J 7/0045
USPC ......................................................... 320/107
See application file for complete search history.

(56) References Cited

U.S. PATENT DOCUMENTS

2016/0099592 A1 4/2016 Gatta et al.
2016/0205800 A1* 7/2016 Roberts ................ H02J 7/0045
361/809

FOREIGN PATENT DOCUMENTS

| CN | 1577951 A | | 2/2005 |
| CN | 101523688 A | | 9/2009 |
| CN | 201556959 U | | 8/2010 |
| CN | 203205936 | * | 9/2013 |
| CN | 203205936 U | | 9/2013 |
| CN | 203707404 U | | 7/2014 |
| CN | 203707430 U | | 7/2014 |
| CN | 203813462 | * | 9/2014 |
| CN | 203813462 U | | 9/2014 |
| CN | 104337170 A | | 2/2015 |
| CN | 205549054 U | | 9/2016 |

(Continued)

OTHER PUBLICATIONS

World Intellectual Property Organization (WIPO) International Search Report for PCT/CN2016/100888 Jul. 4, 2017 6 Pages.

*Primary Examiner* — Nathaniel R Pelton
(74) *Attorney, Agent, or Firm* — Anova Law Group, PLLC

(57) ABSTRACT

A charging dock is provided. The charging dock includes: a main body; a charging unit disposed with the main body; and a plurality of cover plates. The charging unit includes a plurality of battery sockets. Each cover plate corresponds to one of the plurality of battery sockets. Each cover plate is movably connected to the main body. And each cover plate is switchable between a closed configuration covering the corresponding battery socket and an open configuration exposing the corresponding battery socket. Further, a charging assembly is provided. The charging assembly includes the forgoing charging dock and a rechargeable battery configured to be mounted on one of the plurality of cover plates in the open configuration, and plugged into the corresponding battery socket.

19 Claims, 9 Drawing Sheets

(56) References Cited

FOREIGN PATENT DOCUMENTS

| | | |
|---|---|---|
| CN | 206117226 U | 4/2017 |
| JP | 2000152511 A | 5/2000 |

* cited by examiner

CHARGING DOCK AND CHARGING ASSEMBLY

CROSS-REFERENCE TO RELATED APPLICATION

This application is a continuation application of International Application No. PCT/CN2016/100888, filed on Sep. 29, 2016, the entire contents of which are incorporated herein by reference.

TECHNICAL FIELD

The present invention relates to battery technologies and, in particular, to a charging dock and a charging assembly.

BACKGROUND

Many electronic devices are equipped with rechargeable batteries. Due to the capacity and battery life limit of rechargeable batteries, it is sometimes necessary to use a plurality of rechargeable batteries. It may be more efficient and convenient to use a multi-charge battery charger to charge and manage multiple rechargeable batteries than to use a general charger. Many existing multi-charge battery chargers are flat in design, and the rechargeable batteries are installed side by side when charging. These chargers may be bulky in their sizes and not conveniently portable. Further, it may take some effort for the placement and retrieval of rechargeable batteries into and from these chargers.

SUMMARY

In order to overcome some of the drawbacks of existing multi-charge battery chargers, the present disclosure provides a charging dock and assembly having a compact size for convenient storage, and capable of charging a plurality of rechargeable batteries. Accordingly, the technical solutions to solve the technical problem of the present disclosure include the followings.

In one aspect of the present disclosure, a charging dock is provided. The charging dock includes: a main body; a charging unit disposed with the main body; and a plurality of cover plates. The charging unit includes a plurality of battery sockets. Each cover plate corresponds to one of the plurality of battery sockets. Each cover plate is movably connected to the main body. And each cover plate is switchable between a closed configuration covering the corresponding battery socket and an open configuration exposing the corresponding battery socket.

In certain embodiments, for each cover plate, a first end of the cover plate is rotatably coupled to the main body; and the cover plate is configured to carry a corresponding rechargeable battery when the cover plate is in the open configuration.

In certain embodiments, for each cover plate, a bottom end of the cover plate is coupled to a bottom end of the main body; when the cover plate is in the open configuration, the bottom end of the cover plate abuts against the bottom end of the main body; and when the plurality of cover plates are in the open configuration, the plurality of cover plates are located on a same plane.

In certain embodiments, for each cover plate, the cover plate includes an orienting member for guiding the corresponding rechargeable battery when the corresponding rechargeable battery is being mounted.

In certain embodiments, for each cover plate, the cover plate includes a groove; and when the cover plate is in the closed configuration, the groove is configured to receive the battery socket corresponding to the cover plate.

In certain embodiments, the plurality of cover plates are located around the main body.

In certain embodiments, the plurality of cover plates are arranged in an annular array on an outer surface of the main body; and the charging dock has a cylindrical outer shape when the plurality of cover plates are in the closed configuration.

In certain embodiments, the main body has a plurality of receiving slots, each receiving slot corresponding to one of the plurality of cover plates; and each receiving slot is configured to receive the corresponding cover plate when the corresponding cover plate is in the closed configuration.

In certain embodiments, for each receiving slot, the receiving slot includes a bottom wall and two sidewalls on two opposing sides of the bottom wall; and the bottom wall has a through slot for the corresponding battery socket to penetrate through.

In certain embodiments, for each cover plate, the charging dock further includes a lock mechanism corresponding to the cover plate. When the cover plate is in the closed configuration, the lock mechanism is configured to lock the cover plate to the main body. When the cover plate is in the open configuration, the lock mechanism is configured to lock a rechargeable battery corresponding to the cover plate. The lock mechanism includes one or more of: a hook mechanism, a latch mechanism, and an electromagnetic attraction mechanism.

In certain embodiments, for each cover plate, the corresponding lock mechanism includes a first hook. The cover plate includes a second hook. And when the cover plate is received in the main body, the second hook engages with the first hook.

In certain embodiments, the second hook has a chamfer feature.

In certain embodiments, for each cover plate, the corresponding lock mechanism further comprises a pressing member and a resilient member. The pressing member is located on the main body and connected to the first hook. The resilient member is connected between the pressing member and the main body. When a pressing operation is applied to the pressing member and the cover plate is in the closed configuration, the first hook is separated from the second hook and the resilient member is compressed. When the pressing operation is withdrawn, the first hook is returned to an original position by the resilient member.

In certain embodiments, the resilient member is a spring.

In certain embodiments, the charging dock further includes: a mainboard; a connector; and a charging plate electrically connected to the mainboard through the connector.

In certain embodiments, the connector includes a first metal ring and a second metal ring. The first metal ring is connected to a first end of the mainboard. The second metal ring is connected to a second end of the mainboard. The charging plate is fixed and electrically connected between the first metal ring and the second metal ring of the connector.

In certain embodiments, the charging plate is one of a plurality of charging plates. Each of the plurality of charging plate corresponds to one of the plurality of battery sockets.

In another aspect of the present disclosure, a charging assembly is provided. The charging assembly includes a charging dock and a rechargeable battery. The charging dock includes: a main body; a charging unit, the charging unit including a plurality of battery sockets; and a plurality of cover plates. Each cover plate corresponding to one of the plurality of battery sockets. Each cover plate is movably connected to the main body. Each cover plate is switchable between a closed configuration covering the corresponding battery socket and an open configuration exposing the corresponding battery socket. The rechargeable battery is configured to be mounted on one of the plurality of cover plates in the open configuration, and plugged into the corresponding battery socket.

In certain embodiments, the rechargeable battery includes a connecting member. The connecting member is configured to lock the rechargeable battery with the charging dock when the rechargeable battery is mounted on one of the plurality of cover plates.

Further, in certain embodiments, the rechargeable battery further includes a guiding member configured to guide the rechargeable battery when the rechargeable battery is being mounted on one of the plurality of cover plates.

BRIEF DESCRIPTION OF THE DRAWINGS

In order to more clearly illustrate the technical solutions in the embodiments of the present disclosure, the drawings used in the description of the embodiments are briefly described below. It is obvious that the drawings in the description are only some embodiments of the present disclosure. Other drawings can also be derived by those of ordinary skill in the art based on the disclosed drawings without creative efforts.

The technical solutions will be further illustrated by the following detailed description in conjunction with the accompanying drawings.

DETAILED DESCRIPTION OF THE EMBODIMENTS

The technical solutions according to the embodiments of the present disclosure are described in the following with reference to the accompanying drawings. The described embodiments are only some embodiments of the present disclosure. All other embodiments derived by a person of ordinary skill in the art based on the described embodiments of the present disclosure without creative efforts are within the scope of the present disclosure.

It should be noted that when a component is referred to as being "fixed" to another component, it may be directly on the other component or may be through an intermediate component. When a component is considered to "connect" another component, it may be directly connected to the other component or may be through an intermediate component. When a component is considered to be "installed" on another component, it may be directly installed on the other component or may be through an intermediate component. The terms "vertical", "horizontal", "top", "bottom" and the like are used herein for the purpose of illustration only.

Unless otherwise defined, all technical and scientific terms used herein have the same meanings as commonly understood by one of ordinary skill in the art to which this invention belongs. The technical terms used in the description of the present disclosure are for the purpose of describing certain embodiments and are not intended to limit the invention. The term "or/and" as used herein includes any and all combinations of one or more of the associated listed items.

The present disclosure provides a charging dock for charging rechargeable batteries. The charging dock may include a plurality of cover plates. The cover plates may be switchable between a closed configuration and an open configuration. When a cover plate is in a closed configuration, the cover plate is locked to the charging dock by a lock mechanism. When a cover plate is in an open configuration, the cover plate may carry a rechargeable battery for charging, and the lock mechanism may lock the rechargeable battery. The charging dock may further include a charging assembly that connects a plurality of charging plates with a connector to provide electrical connections for simultaneously charging a plurality of rechargeable batteries.

Some embodiments of the present disclosure are described in detail below with reference to the accompanying drawings. The features of the embodiments and examples described below may be combined with each other without conflict.

Figure 1:
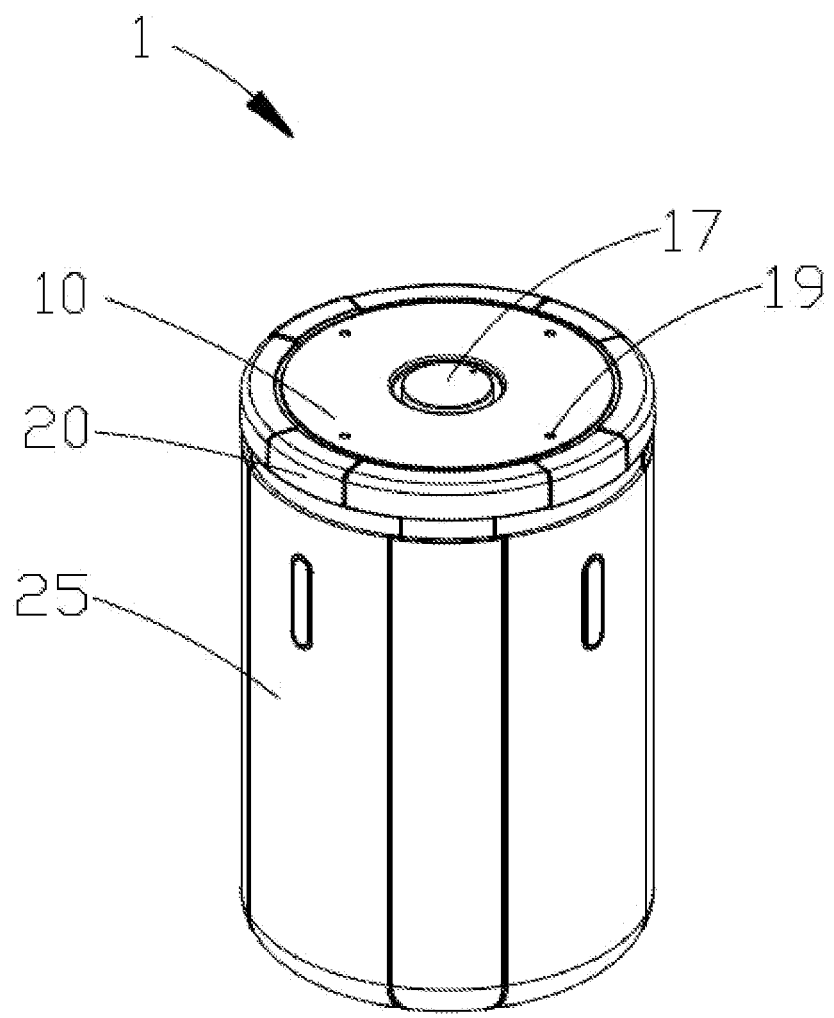
FIG. 1 is a perspective view of a charging dock in a closed configuration according to an embodiment of the present disclosure.
Figure 2:
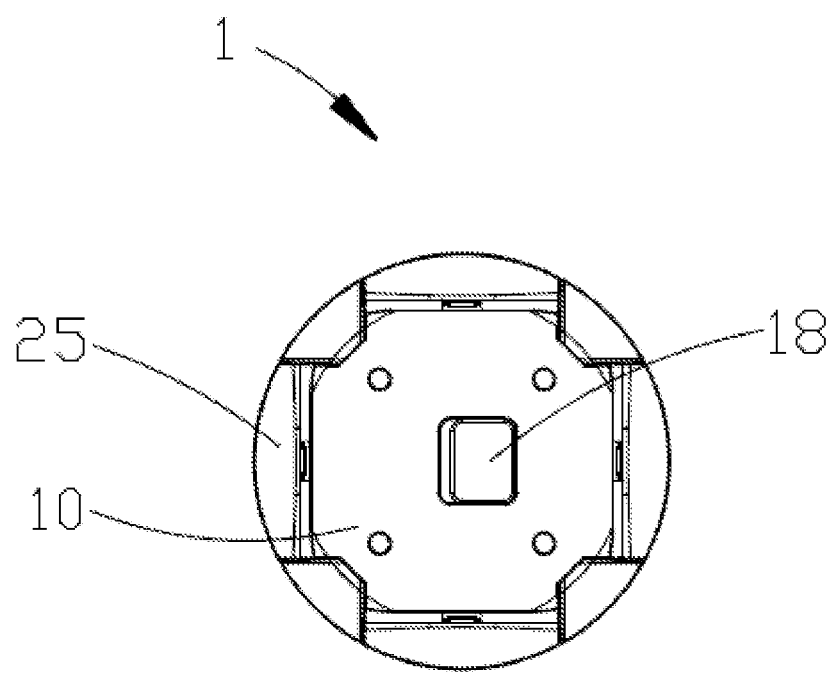
FIG. 2 is a bottom view of the charging dock shown in FIG. 1 in a closed configuration.
Figure 3:
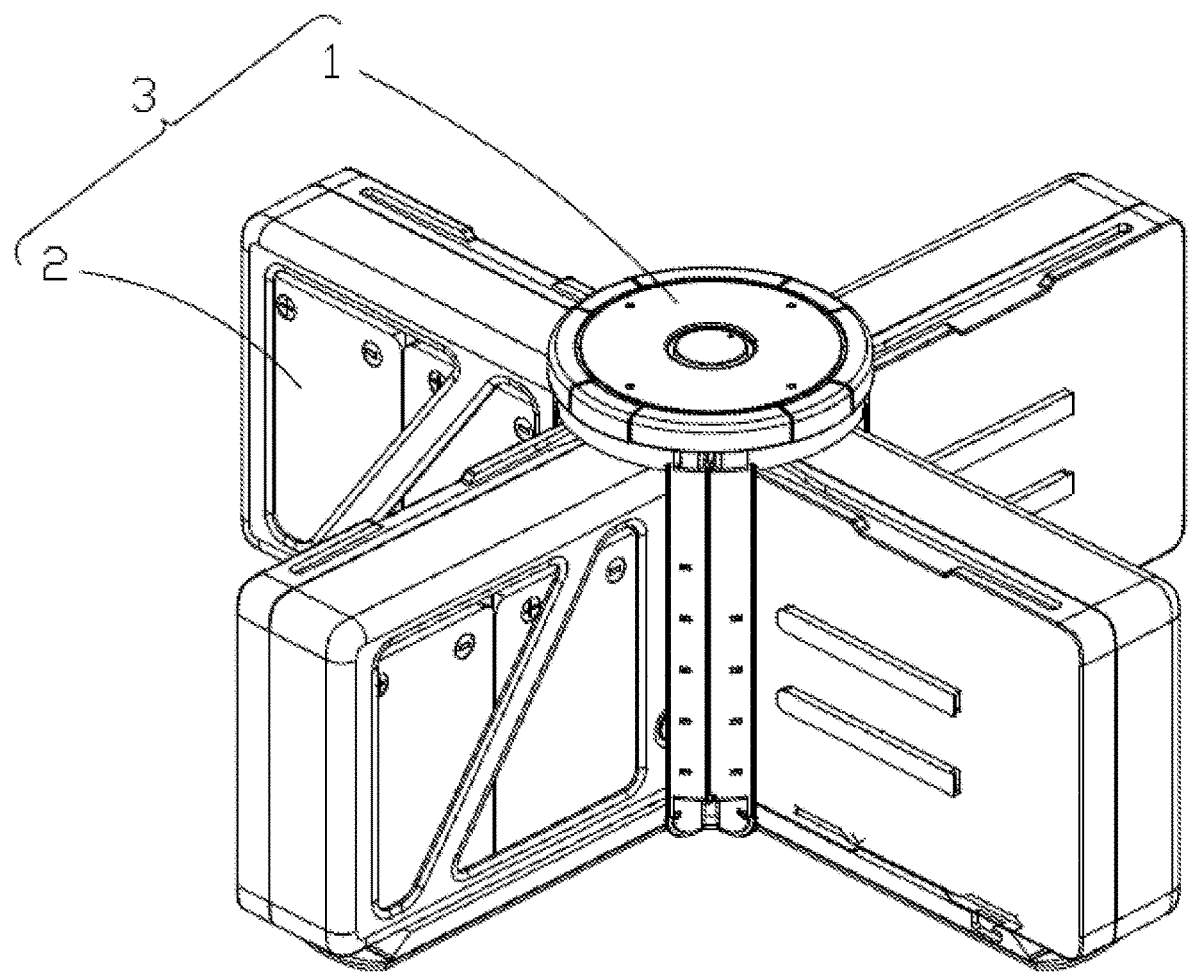
FIG. 3 is a perspective view of the charging dock shown in FIG. 1 having four rechargeable batteries installed.

Referring to FIGS. 1-3, according to certain embodiments of the present disclosure, a charging dock 1 for charging one or more rechargeable batteries 2 is provided. In certain embodiments, the rechargeable battery 2 may be used on a mobile device such as an unmanned aerial vehicle (not shown). An unmanned aerial vehicle (UAV) may be equipped with multiple rechargeable batteries. When a rechargeable battery is exhausted, it may be replaced by a fully charged spare rechargeable battery in time to increase the navigation time of the UAV. The charging dock 1 and the plurality of rechargeable batteries 2 may be combined into a charging assembly 3.

In certain embodiments, the charging dock 1 may include a main body 10, a plurality of cover plates 25, and a charging unit 30. The charging unit 30 may be configured in the main body 10 (referring to FIG. 9).

The main body 10 may be substantially cylindrical. The plurality of cover plates 25 may be distributed on the outer surface of the main body 10. In certain embodiments, the number of the cover plates 25 may be four, and the four cover plates 25 may be arranged in an annular array around the main body 10. Therefore, the charging dock 1 may simultaneously charge four rechargeable batteries 2.

In certain embodiments, optionally, one of the four cover plates 25 may be in an open configuration to charge one of the rechargeable batteries 2. Optionally, two of the four cover plates 25 may be in an open configuration to charge two of the rechargeable batteries 2. Optionally, three of the four cover plates 25 may be in an open configuration to charge three of the rechargeable batteries 2. Or, the four cover plates 25 may all be in an open configuration to charge the four rechargeable batteries simultaneously. Further, when less than four of the rechargeable batteries 2 need to be charged, the four cover plates 25 may all be in an open configuration.

The outer shape of the main body 10 is not limited to a circular cylindrical shape. It may be, for example, a rectangular cylinder, a square cylinder, or other polygonal cylinders in certain other embodiments. The number of cover plates 25 is not limited to four. There may be one, two, three, five, six, etc., cover plates, and the number may be adjusted according to a specific design. As an example, according to the following embodiments described herein, the charging dock 1 includes four cover plates 25. Charging docks having different numbers of cover plates 25 may have similar structures and are not described in detail one by one.

Figure 4:
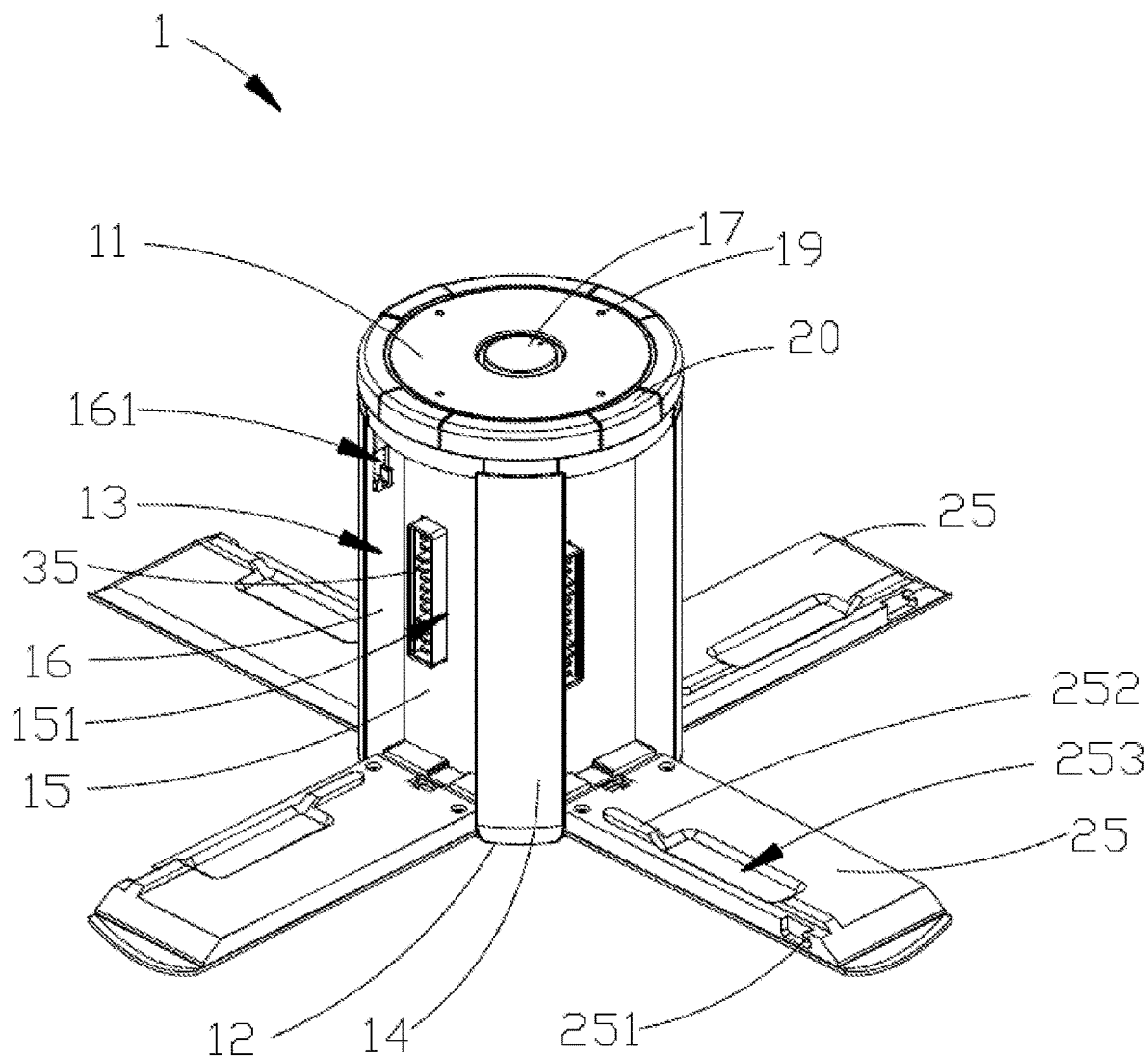
FIG. 4 is a perspective view of the charging dock shown in FIG. 1 in an open configuration.
Figure 5:
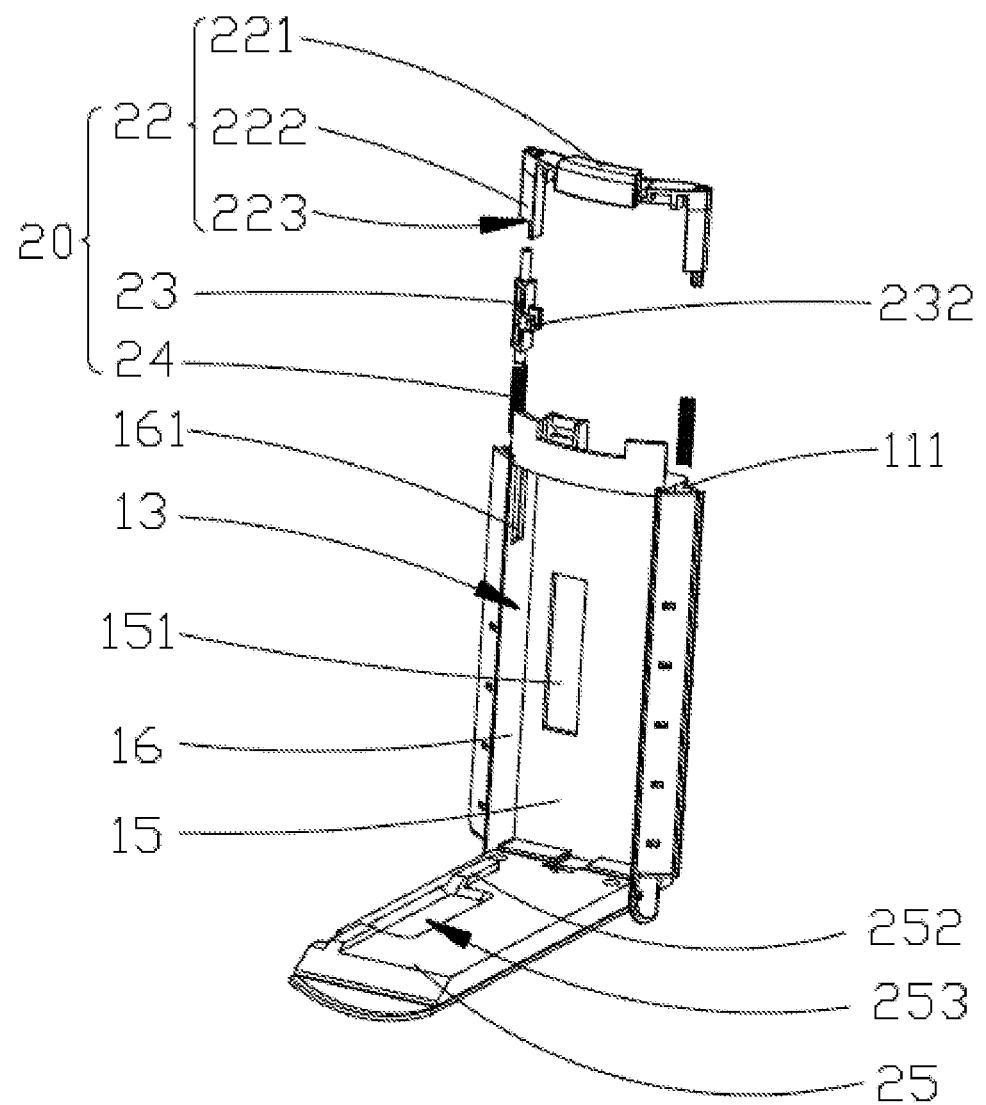
FIG. 5 is an exploded view showing a cover plate and corresponding assembly structure of the charging dock shown in FIG. 4.
Figure 6:
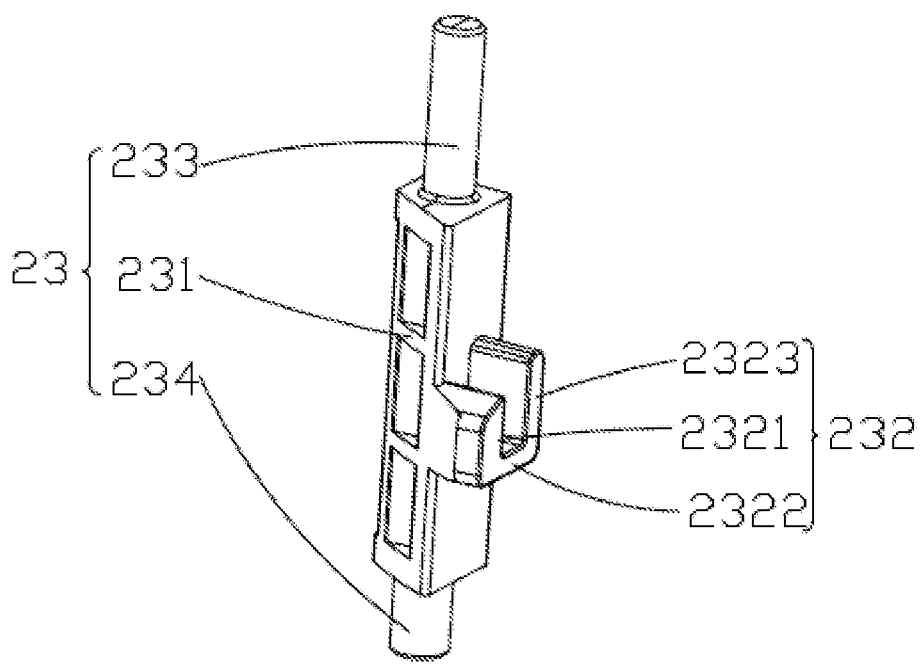
FIG. 6 is a perspective view showing a locking member of the charging dock shown in FIG. 5.

Also referring to FIGS. 4-6, according to certain embodiments, the main body 10 may include a top end 11, a bottom end 12, receiving slots 13 and connecting walls 14. There may be a plurality of receiving slots 13 located between the top end 11 and the bottom end 12. Each connecting wall 14 may connect two adjacent receiving slots 13.

Each of the receiving slots 13 may correspond to one of the cover plates 25. Therefore, the receiving slots 13 may also be arranged in an annular array on the outer side of the main body 10. Each of the receiving slots 13 may be surrounded by a bottom wall 15, side walls 16 on two sides of the bottom wall 15, the top end 11, and the bottom end 12 of the main body 10. The two side walls 16 may be oppositely configured.

Each cover plate 25 may be configured corresponding to one of the receiving slots 13 of the main body 10. One end of a cover plate 25 may be movably coupled to the main body 10. The movable connecting mechanism of the cover plate 25 and the main body 10 may be a rotary connection, a sliding connection, or the like. In certain embodiments described herein, the cover plate 25 is rotatably coupled to the main body 10.

Specifically, a bottom end of each cover plate 25 may be rotatably coupled to the bottom end 12 of the main body 10. When a cover plate 25 is in an open configuration, the cover plate 25 may be turned downwards from the top end 11 of the main body 10 and open outwards. The cover plate 25 may be used to carry a rechargeable battery 2. In certain embodiments described herein, each of the cover plates 25 may be movably coupled to the main body 10 by a lock mechanism 20.

To switch a cover plate 25 from a closed configuration to an open configuration, the lock mechanism 20 may be unlocked and the cover plate 25 may be turned in a direction away from the main body 10. Further, in certain embodiments, the angle of rotation of the cover plate 25 may be approximately 90°. That is, when the cover plate 25 is locked on the main body 10 (as shown in FIG. 1), the cover plate 25 is in a vertical state; when the cover plate 25 is unlocked and turned over by 90°, the cover plate 25 is in a horizontal state where the bottom end of the cover plate 25 is held at the bottom end 12 of the main body 10. When the four cover plates 25 are all turned into the open configuration, the four cover plates 25 may be located on a same plane, and the four cover plates 25 may function to support and stabilize the charging dock 1.

The lock mechanism 20 may be fixed on the main body 10. The lock mechanism 20 may be implemented with a hook mechanism, a latch mechanism, an electromagnetic attraction mechanism or other mechanisms with interlocking functions. In certain embodiments described herein, the lock mechanism 20 may be a hook mechanism that includes a pressing member 22, a latch member 23, and a resilient member 24. The pressing member 22 may be mounted on the top end 11 of the main body 10. The latch member 23 may be coupled to the pressing member 22. And the resilient member 24 may abut against the latch member 23 and the main body 10. When the pressing member 22 is pressed, the latch member 23 may move in the pressing direction and compress the resilient member 24.

In certain embodiments, the pressing member 22 may include a push button 221 and a connecting post 222. The connecting post 222 may extend perpendicularly from the push button. In certain embodiments, the push button 221 may be an arc-shaped strip forming a convex button in the middle to facilitate pressing and having a good pressing feel. There may be two connecting posts 222, and each connecting post 222 may extend vertically downward from one end of the push button 221 for connecting the latch member 23.

The latch member 23 may include a latch main body 231 and a first hook 232. The first hook 232 may be formed on a side surface of the latch main body 231. The cover plate 25 may be configured with a second hook 251. The second hook 251 may be located on a side surface of the cover plate 25 and corresponds to the first hook 232 of the lock mechanism 20.

In certain embodiments, the first hook 232 may be substantially J-shaped, and include a first barrier bar 2321, a second barrier bar 2322, and a connecting bar 2323 between the first barrier bar 2321 and the second barrier bar. The first barrier bar 2321 may be parallel to the second barrier bar 2322 and near a corresponding connecting wall 14. A height of the first barrier bar 2321 may be less than a height of the second barrier bar 2322. The first barrier bar 2321 may be configured to engage the second hook 251. And the second barrier bar 2322 may be configured to prevent the second hook 251 from being engaged excessively.

Figure 7:
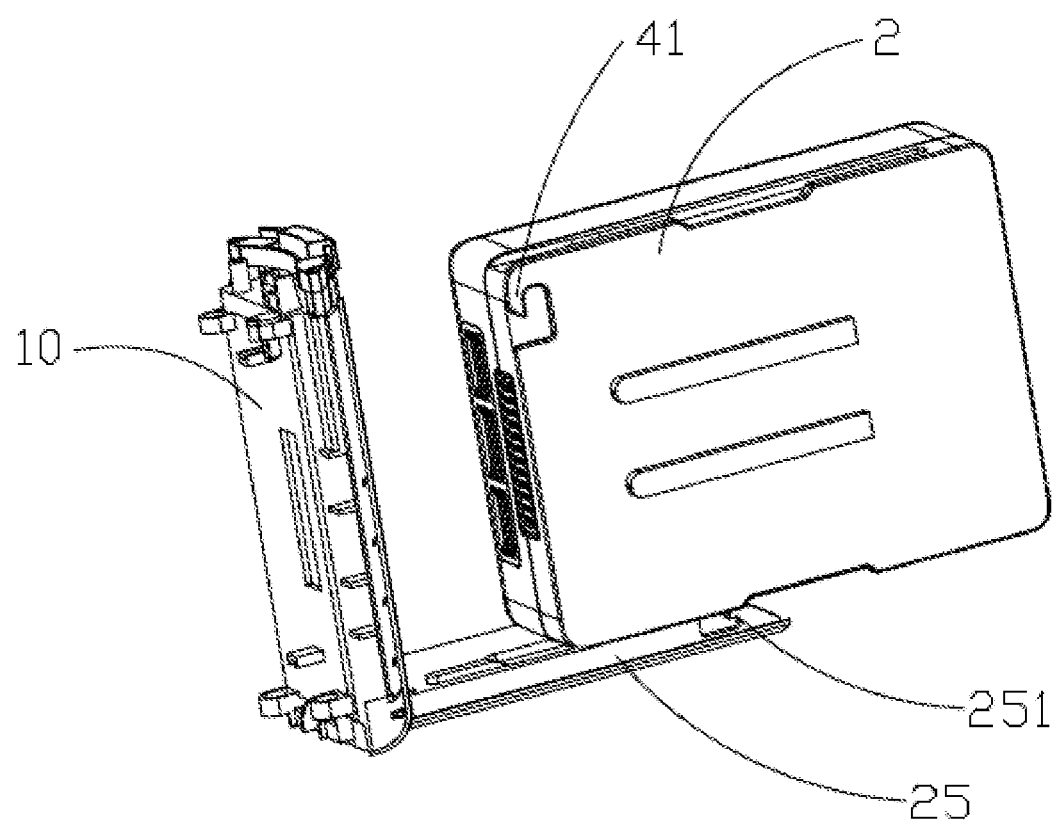
FIG. 7 is a perspective view showing a cover plate of the charging dock shown in FIG. 1 connecting with a corresponding rechargeable battery.
Figure 8:
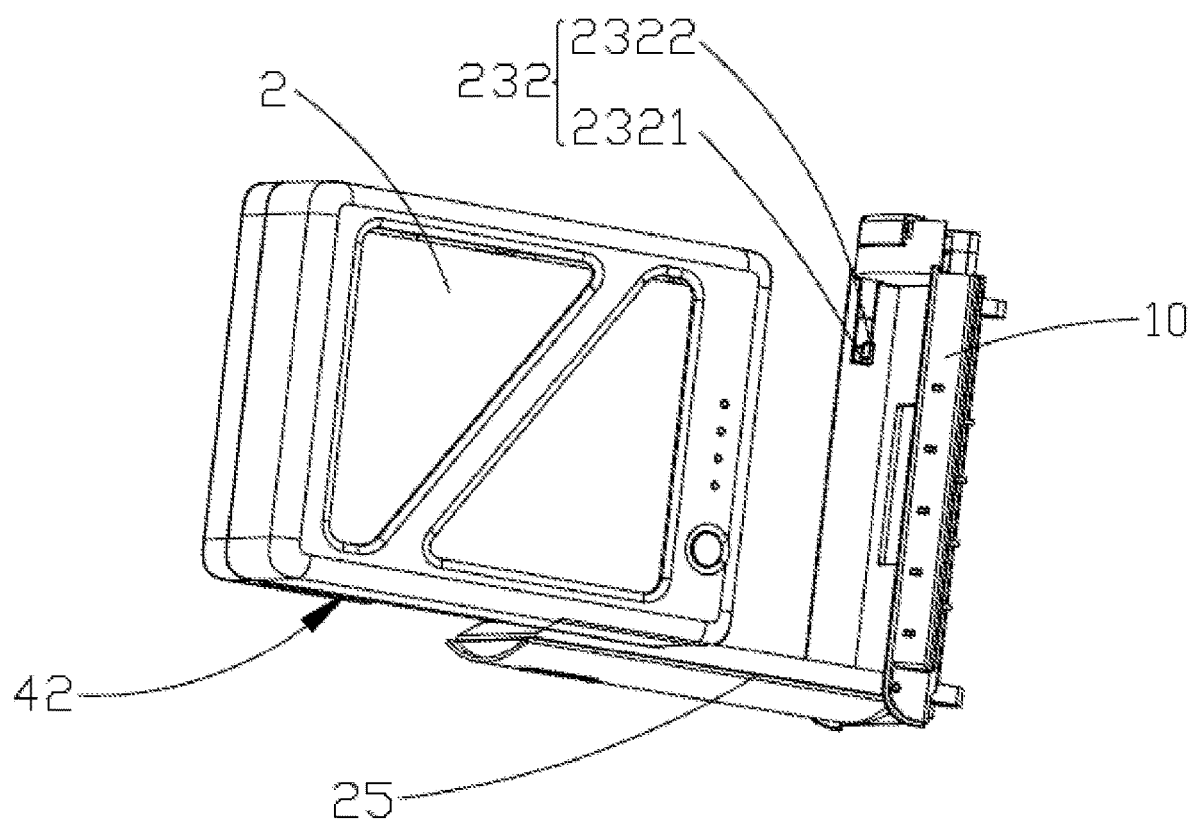
FIG. 8 is another perspective view of the structure shown in FIG. 7.

Referring to FIGS. 7 and 8, in certain embodiments, the second hook 251 may be a hook-shaped structure with a chamfer. The second hook 251 has an outer shape. The outer shape includes a top end and an edge. The chamfer is formed at the top end and the edge of the second hook 251. Because of the chamfer, the outer shape of the second hook 251 can be smooth.

When the cover plate 25 needs to be locked to the main body 10, the cover plate 25 may be rotated from the horizontal state to the vertical state. The second hook 251 may first contact the first barrier bar 2321 of the first hook 232. Since the second hook 251 has a chamfer feature, when the cover plate 25 continues to rotate, the second hook 251 pushes the first barrier bar 2321 of the first hook 232 downward along the chamfer. The first barrier bar 2321 is pushed downward to further push the latch member 23 downward, and the resilient member 24 is compressed until the chamfer of the second hook 251 completely slides over the first barrier bar 2321. The second hook 251 is then engaged between the first barrier bar 2321 and the second barrier bar 2322 to lock the cover plate 25 to the main body 10. Since the height of the second barrier bar 2322 is greater than the height of the first barrier bar 2321, if the cover plate 25 is continuously rotated, the second barrier bar 2322 will abut against the second hook 251 in the direction in which the cover plate 25 rotates to prevent the cover plate 25 from being excessively rotated.

The latch member 23 may further include a first cylinder 233 and a second cylinder 234. The first cylinder 233 and the second cylinder 234 may protrude from opposite ends of the latch main body 231 in opposite directions. The connecting post 222 of the pressing member 22 may have a connecting hole 223. The first cylinder 233 may be inserted into the connecting hole 223, and the second cylinder 234 may be connected to the resilient member 24. Further, the top end 11 of the main body 10 may have a mounting hole 111 corresponding to each second cylinder 234 for inserting the second cylinder 234, thereby connecting the lock mechanism 20 to the main body 10.

It may be understood that the latch member 23 may be integrally formed with the pressing member 22 without assembling between the two. That is, the first cylinder 233 of the latch member 23 may directly form an integral structure with the connecting post 222 of the pressing member 22 without assembling between the two.

The resilient member 24 may be a spring. The spring may be sleeved on the second cylinder 234 and received in the mounting hole 111 together with the second cylinder 234, so that the spring may abut against the latch main body 231 of the latch member 23 and the interior of the mounting hole 111 of the main body 10. When the cover plate 25 is in a closed configuration and the pressing member 22 is pressed, the first hook 232 and second hook 251 may be separated and the resilient member 24 may be compressed. When the pressure on the pressing member 22 is withdrawn, the first hook 232 may be returned to an original position by the restoring force of the resilient member 24.

A through hole 161 may be configured in one of the opposite side walls 16 of the main body 10. When the lock mechanism 20 is installed on the main body 10, the first hook 232 may protrude from the through hole 161 to lock with the second hook 251 of the cover plate 25. The through hole 161 functions to limit the position of the first hook 232, so that the lock mechanism 20 is installed on the main body 10.

In certain other embodiments, the position of first hook 232 of the lock mechanism 20 may not be limited to the side wall 16 of the main body 10. Instead, it may be at the top end 11 of the main body 10. Correspondingly, the second hook 251 is not limited to be positioned on a side of the cover plate 25, but may be configured at a top end of the cover plate 25 to be engaged with the first hook 232.

Figure 9:
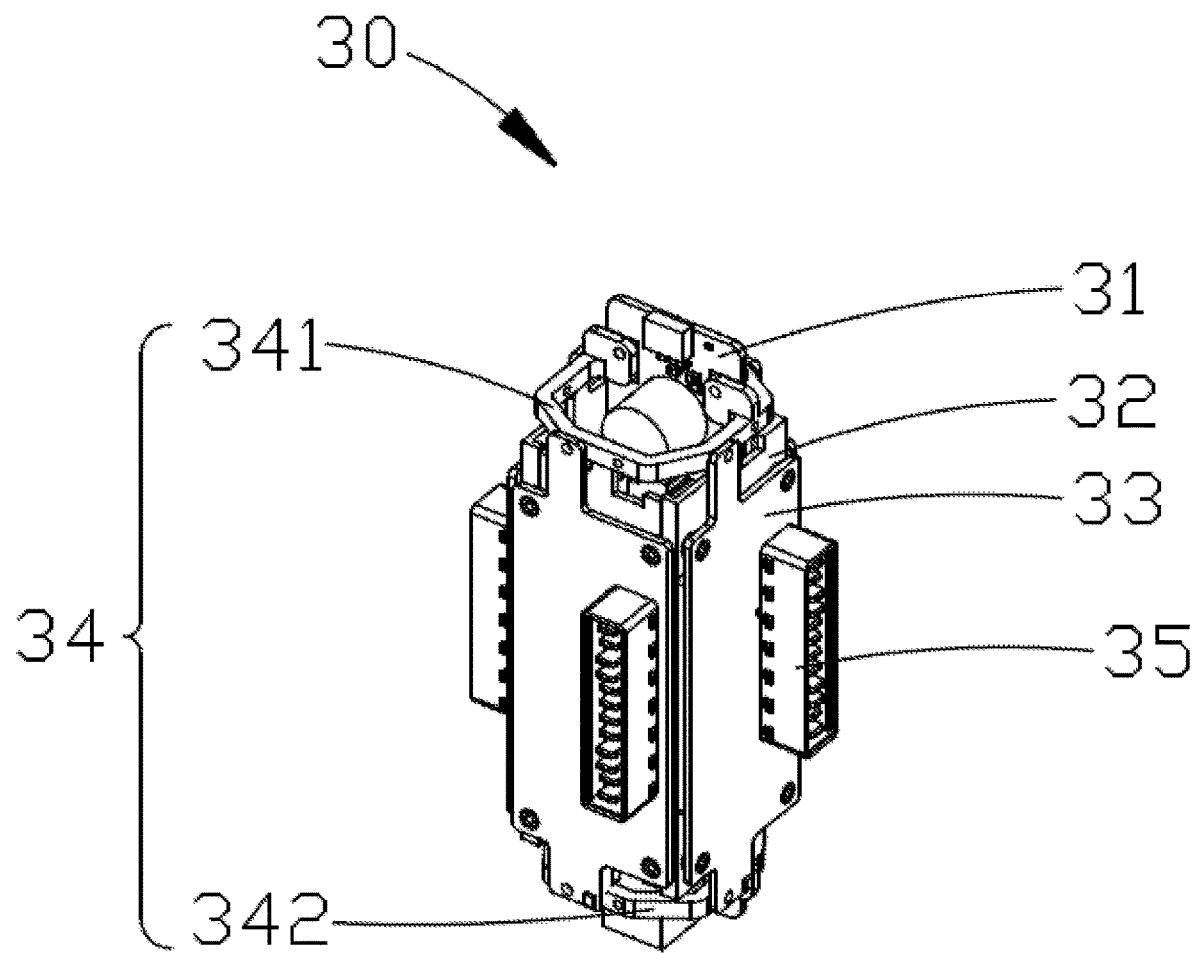
FIG. 9 is a perspective view showing internal structures of the charging dock shown in FIG. 1.

Referring to FIG. 9, in certain embodiments, the charging unit 30 may be installed in the main body 10. The charging unit 30 may include a mainboard 31, a frame 32, charging plates 33, and battery sockets 35. The frame 32 may be a hollow structure, and the mainboard 31 may be mounted on the frame 32. The charging plates 33 may be attached to the outer surface of the frame 32 and electrically connected to the mainboard 31. The number and position of the charging plates 33 may be the same as the number and position of the cover plates 25. In certain embodiments described herein, the number of the charging plates 33 is four, and the frame 32 is a hollow rectangular cylinder. The four charging plates 33 may be attached to the four outer surfaces of the frame 32. A battery socket 35 may be configured on each of the charging plates 33, and electrically connected to the mainboard 31 through the charging plate 33.

The battery socket 35 may be configured facing away from the frame 32, and the bottom wall 15 of the main body 10 may be provided with a through slot 151. When the charging unit 30 is installed in the main body 10, the battery socket 35 may be configured through the through slot 151 to protrude into each of the receiving slots 13 of the main body 10 for the rechargeable battery 2 to plug in.

In certain embodiments, each cover plate 25 may include a groove 253. When the cover plate 25 is in the closed configuration, the groove 253 is configured to receive the battery socket corresponding to the cover plate.

In certain embodiments, the frame 32 may be omitted, and the four charging plates 33 may be sequentially and directly connected, thus forming a structure similar to the frame 32.

Each of the charging plates 33 may be electrically connected to the mainboard 31 through a connector 34. The connector 34 may include a positive end 341 and a negative end 342. The positive end 341 may be electrically connected to one end of the mainboard 31, and the negative end 342 may be electrically connected to another end of the mainboard 31. One end of the charging plate 33 may be electrically connected to the positive end 341, and another end of the charging plate 33 may be electrically connected to the negative end 342.

In certain embodiments, the plurality of charging plates 33 may each correspond to a separate positive end and a negative end. In certain embodiments described herein, the four charging plates 33 may share one positive end 341 and one negative end 342. The positive end 341 and the negative end 342 may be electrically conductive metal ring structures, and may be copper rings in certain embodiments. Each copper ring may be fixed to one end of the mainboard 31 and electrically connected to the mainboard 31. Each of the four charging plates 33 may be connected between the two copper rings and electrically connected to the two copper rings, thereby connecting the four charging plates 33 to the mainboard 31 in parallel.

A power input interface 17 may be configured on the top end 11 of the main body 10. The power input interface 17 may be electrically connected to the charging unit 30 installed in the main body 10 for connecting an external power source to the charging dock 1. Thereby, the rechargeable batteries 2 connected to the charging dock 1 may be charged. One of the two ends of the mainboard 31 may be electrically connected to the power input interface 17 of the top end 11 of the main body 10. Indicator lights 19 may be further configured on the top end 11 of the main body 10. In certain embodiments, the number of the indicator lights 19 is four, and indicator lights 19 may be evenly distributed around the power input interface 17.

A USB interface 18 may be configured on the bottom end 12 of the main body 10. The USB interface 18 may be electrically connected to the charging unit 30 of main body 10 for expanding the functionality of the charging dock 1. The other end of the mainboard 31 may be electrically connected to the USB interface 18 of the bottom end 12 of the main body 10.

When the charging dock 1 is not in use, it may be in a closed configuration. That is, the lock mechanism 20 of each cover plate 25 locks the cover plate 25 onto the main body 10. In this configuration, the first hook 232 of the latch member 23 and the second hook 251 of the cover plate 25 are engaged with each other, and the cover plate 25 covers the battery socket 35. Thus, the main body 10 and the cover plates 25 together form a cylindrical structure. In this configuration, the charging dock 1 has a compact size and may be conveniently carried and transported.

When it is necessary to charge one or more of the rechargeable batteries 2, a corresponding number of the cover plates 25 in the charging dock 1 may be switched from the closed configuration to the open configuration. That is, the lock mechanism 20 is pressed, the first hook 232 of the latch member 23 is separated from the second hook 251 of the cover plate 25. The cover plate 25 may be rotated from its vertical state to the horizontal state. In this configuration, the battery socket 35 is exposed from the cover plate 25.

Thus, the rechargeable battery 2 may be placed on the cover plate 25 and inserted into the battery socket 35 to be charged.

The rechargeable battery 2 may be further configured with a connecting member 41. When the rechargeable battery 2 is being charged on the cover plate 25, the connecting member 41 may be locked with the charging dock 1 to lock its position on the cover plate 25, thus preventing the rechargeable battery 2 from slipping off.

In certain embodiments described herein, the structure of the connecting member 41 may be substantially the same as the structure of the second hook 251 on the cover plate 25. The connecting member 41 may be located at one side of the rechargeable battery 2 and corresponds to the first hook 232 of the lock mechanism 20. The connecting member 41 may be a hook-like structure having a chamfer feature.

The rechargeable battery 2 may further be configured with a guiding member 42. The cover plate 25 may be further configured with an orienting member 252. The guiding member 42 and the orienting member 252 may be coordinated to guide the rechargeable battery 2 when rechargeable battery 2 is being mounted on the cover plate 25. In certain embodiments described herein, the orienting member 252 may be configured on an inner surface of the cover plate 25, and the guiding member 42 may be configured on an outer surface of the rechargeable battery 2. The orienting member 252 may be a ridge structure along a longitudinal direction of the cover plate 25. The guiding member 42 may be a groove structure extending along a longitudinal direction of the rechargeable battery 2. The orienting member 252 may be housed in the guiding member 42 to guide the rechargeable battery 2 during the process in which the rechargeable battery 2 is being mounted in the cover plate 25.

It may be understood that the ridge structure and the groove structure of the guiding member 42 of the rechargeable battery 2 and the orienting member 252 of the cover plate 25 may be interchanged, and the guiding effect may be similarly achieved.

When a rechargeable battery 2 needs to be installed on the cover plate 25 for charging, the charging dock 1 may be switched to an open configuration. The rechargeable battery 2 may be placed on the cover plate 25. The orienting member 252 of the cover plate 25 and the guiding member 42 of the rechargeable battery 2 may be coordinated to guide the rechargeable battery 2 toward the battery socket 35. The connecting member 41 may first contact the first barrier bar 2321 of first hook 232. Since the connecting member 41 has a chamfer, as a charging interface of rechargeable battery 2 is engaging with the battery socket 35, the chamfer of the connecting member 41 pushes the first barrier bar 2321 of the first hook 232 downward, thereby pushing the latch member 23 downward. The resilient member 24 is compressed, until the connecting member 41 is completely slid over the first barrier bar 2321. Then, the connecting member 41 is engaged between the first barrier bar 2321 and the second barrier bar 2322 to lock the rechargeable battery 2 on the main body 10.

The charging dock according to the embodiments of the present disclosure has a plurality of cover plates capable of carrying charging batteries. Further, the cover plate may be switched between a closed configuration and an open configuration, so that the charging dock is not only configured to charge multiple rechargeable batteries simultaneously, but also is configured to close the cover plates when it is not used, reducing the size of the charging dock and facilitating carrying and transportation of the charging dock.

It may be understood that the charging dock is not limited to charging rechargeable batteries used for UAVs. It may also be applied to other mobile devices or remote-control mobile devices such as unmanned vehicles, unmanned boats, and so on. The present disclosure does not describe each application scenario in detail.

The forgoing embodiments are only used to illustrate the technical solutions of the present disclosure, and are not intended to be limiting. Although the present disclosure describes the technical solutions in detail with reference to the preferred embodiments, those skilled in the art may also make other variations and/or exchange certain components without deviating from the spirit and scope of the technical solutions of the present disclosure. All changes made in accordance with the spirit of the present disclosure are intended to be included within the scope of the present disclosure.

What is claimed is:

1. A charging dock, comprising:
   a main body;
   a charging unit disposed with the main body, the charging unit including a plurality of battery sockets; and
   a plurality of cover plates, each cover plate corresponding to one of the plurality of battery sockets,
   wherein:
   each cover plate is movably connected to the main body, a top end of each cover plate is rotatably coupled to the main body;
   each cover plate is switchable between a closed configuration covering the corresponding battery socket and an open configuration exposing the corresponding battery socket; and
   each cover plate is configured to carry a corresponding rechargeable battery when the cover plate is in the open configuration.

2. The charging dock according to claim 1, wherein:
   for each cover plate, a bottom end of the cover plate is coupled to a bottom end of the main body, and when the cover plate is in the open configuration, the bottom end of the cover plate abuts against the bottom end of the main body; and
   when the plurality of cover plates are in the open configuration, the plurality of cover plates are located on a same plane.

3. The charging dock according to claim 1, wherein the cover plate includes an orienting member for guiding the corresponding rechargeable battery when the corresponding rechargeable battery is being mounted.

4. The charging dock according to claim 1, wherein for each cover plate:
   the cover plate includes a groove; and
   when the cover plate is in the closed configuration, the groove is configured to receive the battery socket corresponding to the cover plate.

5. The charging dock according to claim 1 wherein the plurality of cover plates are located around the main body.

6. The charging dock according to claim 5, wherein:
   the plurality of cover plates are arranged in an annular array on an outer surface of the main body; and
   the charging dock has a cylindrical outer shape when the plurality of cover plates are in the closed configuration.

7. The charging dock according to claim 5, wherein:
   the main body has a plurality of receiving slots, each receiving slot corresponding to one of the plurality of cover plates; and
   each receiving slot is configured to receive the corresponding cover plate when the corresponding cover plate is in the closed configuration.

8. The charging dock according to claim 7, wherein for each receiving slot:
the receiving slot includes a bottom wall and two sidewalls on two opposing sides of the bottom wall; and
the bottom wall has a through slot for the corresponding battery socket to penetrate through.

9. The charging dock according to claim 1, wherein for each cover plate:
the charging dock further comprises a lock mechanism corresponding to the cover plate;
when the cover plate is in the closed configuration, the lock mechanism is configured to lock the cover plate to the main body;
when the cover plate is in the open configuration, the lock mechanism is configured to lock a rechargeable battery corresponding to the cover plate; and
the lock mechanism includes one or more of: a hook mechanism, a latch mechanism, and an electromagnetic attraction mechanism.

10. The charging dock according to claim 9, wherein for each cover plate:
the corresponding lock mechanism comprises a first hook;
the cover plate includes a second hook; and
when the cover plate is received in the main body, the second hook engages with the first hook.

11. The charging dock according to claim 10, wherein the second hook has a chamfer.

12. The charging dock according to claim 10, wherein for each cover plate:
the corresponding lock mechanism further comprises a pressing member and a resilient member;
the pressing member is located on the main body and connected to the first hook;
the resilient member is connected between the pressing member and the main body;
when a pressing operation is applied to the pressing member and the cover plate is in the closed configuration, the first hook is separated from the second hook and the resilient member is compressed; and
and when the pressing operation is withdrawn, the first hook is returned to an original position by the resilient member.

13. The charging dock according to claim 12, wherein the resilient member is a spring.

14. The charging dock according to claim 1, further comprising:
a mainboard;
a connector; and
a charging plate electrically connected to the mainboard through the connector.

15. The charging dock according to claim 14, wherein:
the connector comprises a first metal ring and a second metal ring, the first metal ring connected to a first end of the mainboard, and the second metal ring connected to a second end of the mainboard; and
the charging plate is fixed and electrically connected between the first metal ring and the second metal ring of the connector.

16. The charging dock according to claim 15, wherein:
the charging plate is one of a plurality of charging plates; and
each of the plurality of charging plate corresponds to one of the plurality of battery sockets.

17. A charging assembly, comprising:
a charging dock, the charging dock including:
a main body;
a charging unit, the charging unit including a plurality of battery sockets; and
a plurality of cover plates, each cover plate corresponding to one of the plurality of battery sockets, wherein:
each cover plate is movably connected to the main body; and
each cover plate is switchable between a closed configuration covering the corresponding battery socket and an open configuration exposing the corresponding battery socket; and
a rechargeable battery configured to be mounted on one of the plurality of cover plates in the open configuration, and plugged into the corresponding battery socket.

18. The charging assembly according to claim 17, wherein:
the rechargeable battery comprises a connecting member, and the connecting member is configured to lock the rechargeable battery with the charging dock when the rechargeable battery is mounted on one of the plurality of cover plates.

19. The charging assembly according to claim 18, wherein:
the rechargeable battery further comprises a guiding member configured to guide the rechargeable battery when the rechargeable battery is being mounted on one of the plurality of cover plates.

* * * * *